United States Patent [19]

Mimura et al.

[11] Patent Number: 5,648,053

[45] Date of Patent: Jul. 15, 1997

[54] PROCESS FOR REMOVING CARBON DIOXIDE AND NITROGEN OXIDES FROM COMBUSTION GASES

[75] Inventors: Tomio Mimura; Shigeru Shimojo, both of Osaka; Masaki Iijima, Tokyo; Shigeaki Mitsuoka, Hiroshima, all of Japan

[73] Assignees: The Kansai Electric Power Co. Inc., Osaka; Mitsubishi Jukogyo Kabushiki Kaisha, Tokyo, both of Japan

[21] Appl. No.: 539,109

[22] Filed: Oct. 4, 1995

[30] Foreign Application Priority Data

Dec. 15, 1994 [JP] Japan .................. 6-311461

[51] Int. Cl.⁶ ........................................ B01D 47/00
[52] U.S. Cl. .................. 423/210; 423/220; 423/228; 423/229; 423/235
[58] Field of Search ........................ 423/210, 220, 423/239.1, 228, 229, 212, 235, 238

[56] References Cited

U.S. PATENT DOCUMENTS 4,011,298  3/1977  Fukui et al. ............................ 423/235
4,217,238  8/1980  Sartori et al. .......................... 252/192
4,247,321  1/1981  Persinger .
4,640,825  2/1987  Rosenberg ............................ 423/235

FOREIGN PATENT DOCUMENTS

0199037A2   3/1986    European Pat. Off. .
0553643A2   1/1993    European Pat. Off. .
0553643A3   1/1993    European Pat. Off. .
2296455     1/1976    France .
2248586     10/1972   Germany .
2311098     3/1973    Germany .
405337334   of 0000   Japan .

*Primary Examiner*—Deborah Jones
*Assistant Examiner*—Amy M. Harding
*Attorney, Agent, or Firm*—Jacobson, Price, Holman & Stern, PLLC

[57] ABSTRACT

A process for removing both $CO_2$ and $NO_x$ from combustion gases consists, first, in cooling a combustion gas to 50 to 100° C. and adding ozone to oxidize NO in the combustion gas to $NO_2$. Then in a $CO_2$ removal step, the gas is brought into contact with an aqueous solution of an alcoholic hydroxyl-containing secondary- or tertiary-amine to remove $NO_2$ together with $CO_2$ from the gas.

3 Claims, 3 Drawing Sheets

PROCESS FOR REMOVING CARBON DIOXIDE AND NITROGEN OXIDES FROM COMBUSTION GASES

BACKGROUND OF THE INVENTION

1. Field of the Invention

The present invention relates to a process for removing carbon dioxide ($CO_2$) and nitrogen oxides ($NO_x$) from combustion gases. More particularly, it relates to a process for converting nitrogen monoxide (NO), the main constituent of $NO_x$ in combustion gases, into nitrogen dioxide ($NO_2$) by oxidation with ozone and removing the $NO_2$ together with $CO_2$ by absorption from the combustion gases.

2. Description of the Related Art

It is common knowledge these days that the greenhouse effect of $CO_2$ resulting from the burning of fossil fuels is responsible for the global warming and that other combustion products $NO_x$ cause photochemical smog and acid rain. Above all, acid rain has perniciously influenced natural ecosystems, directly attacking forests and farm products, indirectly affecting the plants through changes of soils, and acidifying lakes and rivers and thereby reducing the fish population. Since the air pollutants $CO_2$ and $NO_x$ do extensive harm to the environment across international borders, reducing them is a problem of great urgency.

One approach already taken is recovery and removal of $CO_2$ from combustion gases, e.g., coming out of boilers of thermal power plants that burn much fossil fuels, through contact with an aqueous solution of monoethanolamine (MEA), hindered amine, or the like.

On the other hand, the technology of wet denitration of combustion gases is difficult to develop, because the $NO_x$ concentration is low and more than 90% of $NO_x$ is accounted for by poorly reactive NO. As for dry denitration, a process is already in use which reduces $NO_x$ in combustion gas with the aid of a catalyst and with injection of ammonia. A typical wet process is oxidative absorption, which consists in scrubbing NOx-laden gas with water or a chemical solution, oxidizing NO to $NO_2$ with an oxidizing agent or the like for effective removal of NO, and then scrubbing or directly washing with an oxidizing chemical solution.

The afore-described wet denitration process has drawbacks including high cost of the oxidizing agent to be used for favorable $NO_x$ absorption and the necessity of disposal of the used liquid absorbent. Combustion gases generally contain about 10% $CO_2$, but their $NO_x$ contents are at most hundreds of parts per million, and the addition of an exclusive step for denitration would call for a large-scale equipment. As regards the simultaneous removal of $CO_2$ and $NO_x$, no satisfactory liquid absorbent has been available yet that is capable of removing both of them.

Thus, because of the influence of combustion gases over the environment, there is a strong desire for early development of a process that solves the problems of the prior art, is simple in operation, recovers both $CO_2$ and $NO_x$ with high efficiency, and can be incorporated in existing facilities for the treatment of combustion gases.

SUMMARY OF THE INVENTION

As a result of our research for the solution of the foregoing problems, it has now been found that both $CO_2$ and $NO_x$ can be removed from combustion gases by oxidizing $NO_x$ in advance with ozone to $NO_2$ and allowing a certain liquid absorbent for $CO_2$ removal to remove the thus formed $NO_2$ together with $CO_2$. This discovery has led to the present invention.

The invention thus provides a process for removing both $CO_2$ and $NO_x$ from combustion gases characterized by the steps of cooling a combustion gas to 50° to 100° C., oxidizing NO in the gas to $NO_2$ by the addition of ozone, and bringing the gas into contact with an aqueous solution of an alcoholic hydroxyl-containing secondary- or tertiary-amine and removing $NO_2$ together with $CO_2$ from the gas.

First, under the invention, the inert NO, the main constituent of $NO_x$ in the combustion gas, is oxidized with ozone to $NO_2$ in a combustion-gas treating step or the like. Then, the gas is contacted with an alcoholic hydroxyl-containing secondary- or tertiary-amine aqueous solution as a liquid absorbent for $CO_2$, whereby both $CO_2$ and $NO_2$ are removed for recovery. Of 100 ppm of $NO_x$ present in a combustion gas, about 90% is NO, and if about 90% of the combined amount of the $NO_2$ that results from the oxidation with ozone and the $NO_x$ original $NO_2$ content in the gas could be removed, the $NO_x$ content in the treated gas would reduce to mere 10 ppm or less.

The process of the invention for removal of $CO_2$ and $NO_x$ from combustion gases will now be described in more detail.

In the process of removing $CO_2$ and $NO_x$ in accordance with the invention, the combustion gas desirably is cooled and dedusted at the same time. Cooling is preferably done by direct contact with cooling water to a temperature optimum for the oxidation of $NO_x$ contained in the combustion gas. For the reactivity of ozone toward $NO_x$, the adequate cooling temperature ranges from 50° to 100° C., preferably from 60° to 80° C. As regards dedusting, it is desirable that the combustion gas be dedusted to about the same degree as with a conventional wet flue-gas denitration apparatus.

The NO in the $NO_x$ contained in the cooled combustion gas is easily oxidized to $NO_2$ in the step of oxidation with air that contains ozone supplied by an ozone generator. In the practice of the oxidation step, ozone may be introduced into a duct through which the combustion gas passes. Ordinarily, the $NO_x$ concentration in the combustion gas is low and poorly reactive NO accounts for over 90% of it, and $NO_x$ are mostly oxidized with ozone to $NO_2$. The amount of ozone to be added is usually about one-fold molar amount to the number of moles of the NO content. Adding this much ozone leaves no excess ozone in the ozone-containing ozone and $NO_x$ can form a slight amount of $N_2O_5$. To avoid combustion gas after the reaction. Where ozone and the combustion gas are very poorly mixed, the reaction between this, it is advisable that nozzles for ozone injection into a combustion gas duct be so arranged as to ensure uniform dispersion of ozone in the gas.

$CO_2$ and the $NO_2$ that has resulted from oxidation with ozone are brought into contact with a liquid absorbent, an alcoholic hydroxyl-containing secondary- or tertiary-amine aqueous solution, in the absorption step, where they are both removed by absorption.

The alcoholic hydroxyl-containing secondary-amine aqueous solution as a liquid absorbent for $CO_2$ and $NO_2$ is, for example, an amine that contains one hydroxyl group, such as 2-(methylamino)ethanol (MAE), 2-(ethylamino)ethanol [EAE], 2-(isopropylamino)ethanol (IPAE), N-(n-butyl)ethanolamine, or N-(tert-butyl)ethanolamine, or that contains two hydroxyl groups, such as diethanolamine. Examples of the alcoholic hydroxyl-containing tertiary-amine aqueous solution are those containing one or two hydroxyl groups, such as 2-(dimethylamino)ethanol, 2-(diethylamino)ethanol (DEAE), (N-methyl)diethanolamine (MDEA), (tert-butyl)diethanolamine, triisopropanolamine, 3-(N,N-dimethylamino)-1-propanol, 4-(N,N-dimethylamino)-1-butanol, 2-(N,N-dimethylamino)-2-methyl-1-propanol, and 3-(N,N-dimethylamino)-2,2-dimethyl-1-propanol. These may be used in a combination of two or more, or as a mixture of a compound that promotes the absorption of $CO_2$ and $NO_2$, e.g., piperazine.

DETAILED DESCRIPTION OF THE PREFERRED EMBODIMENTS

Figure 1:
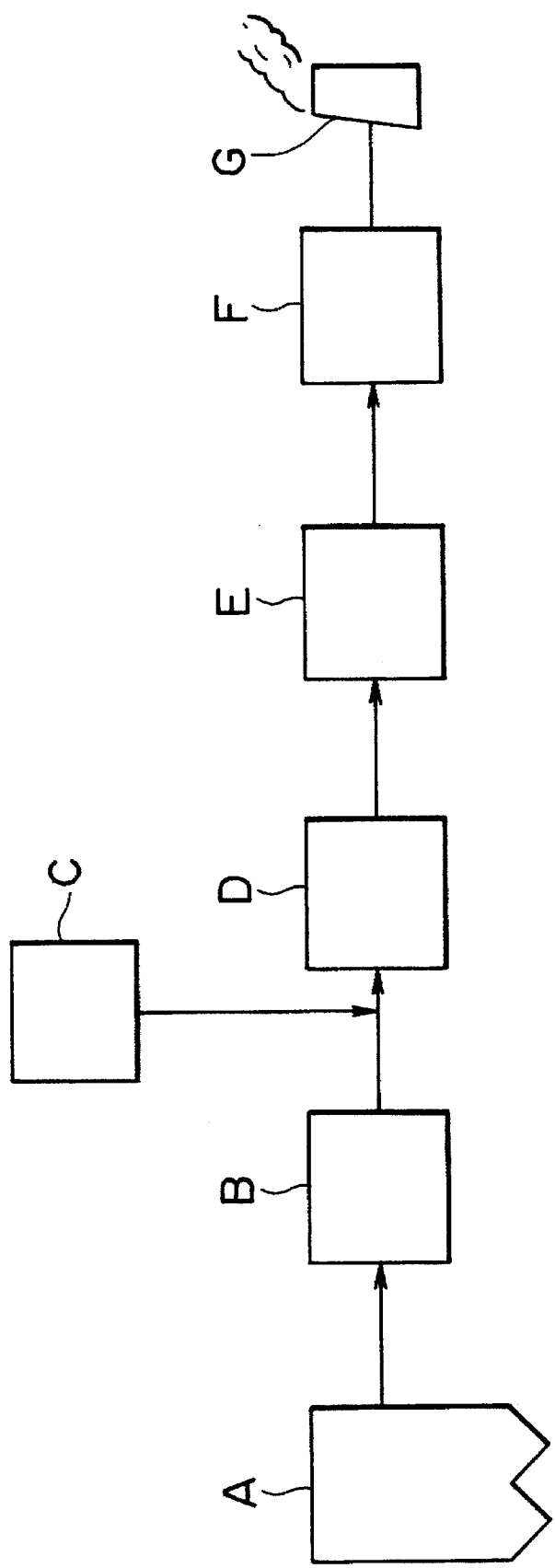
FIG. 1 is a flow chart of the process embodying the present invention.

FIG. 1 shows a flow chart of the process for treating a combustion gas embodying the present invention. The symbol A designates a boiler, B a cooling tower, C an ozone generator, D an oxidation step, E a desulfurization step, F a $CO_2$ and $NO_2$ removal step, and G a stack.

Now, with reference to FIG. 2, the step F for removal of $CO_2$ and $NO_2$ in the flow chart of FIG. 1 according to the invention will be described. Essential equipment components are illustrated but minor ancillary ones are omitted. Unless otherwise specified, the term "$CO_2$" as used herein means that it contains part of $NO_2$.

Figure 2:
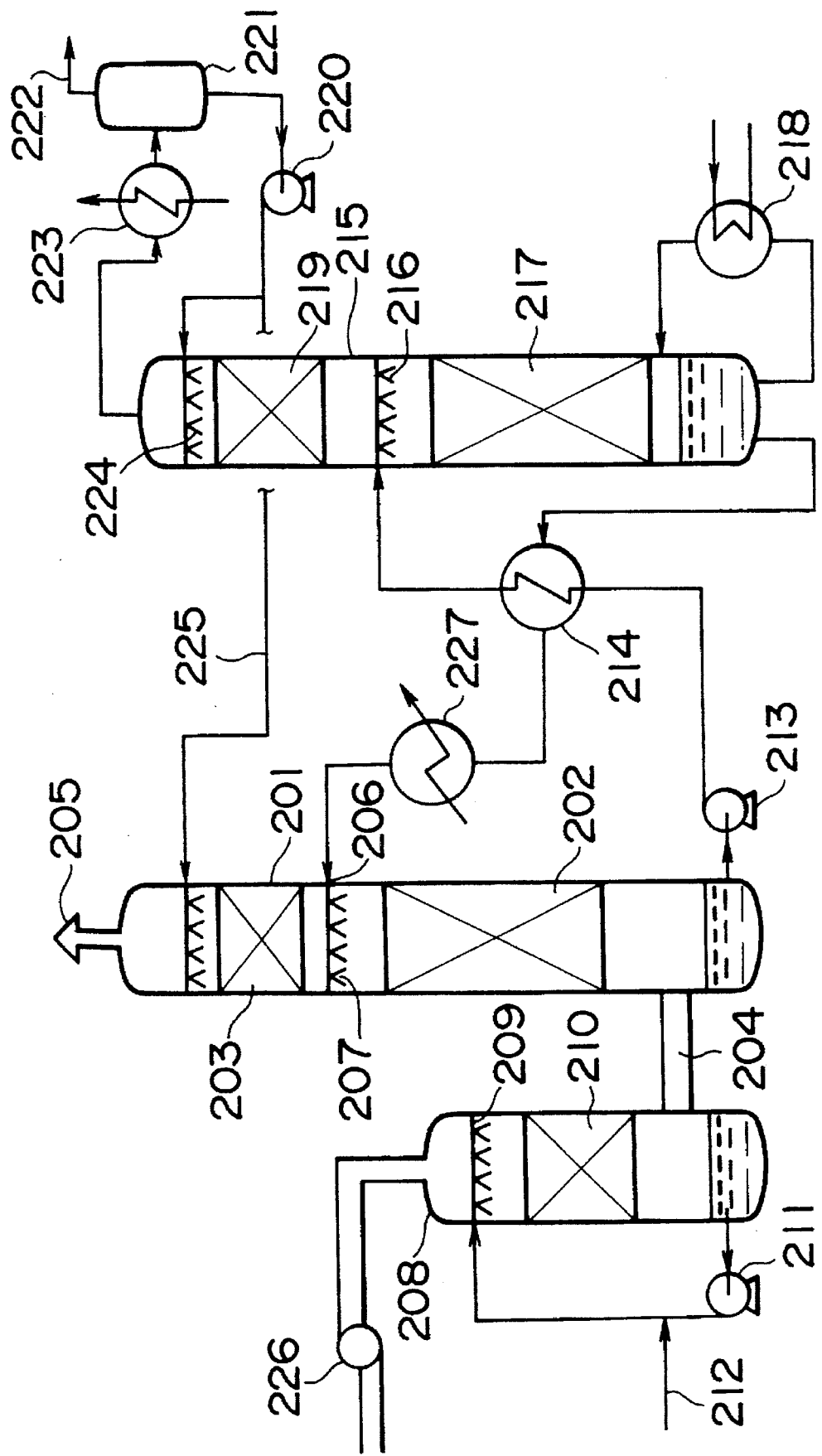
FIG. 2 is a schematic layout for the step for removal of $CO_2$ and $NO_2$ in the flow chart of FIG. 1 according to the invention.

Referring to FIG. 2, there are shown a $CO_2$-removal tower 201, a lower-packing section 202, an upper-packing section or tray 203, a combustion gas inlet 204 of the $CO_2$-removal-tower, a combustion gas outlet 205 of the tower, an inlet 206 of an alcoholic hydroxyl-containing secondary- or tertiary-amine aqueous solution (hereinafter called the "liquid absorbent"), arrays of nozzles 207, a combustion gas cooler 208 (which may be omitted when the temperature of the combustion gas being fed is low enough), nozzles 209, a packing section 210, a moistening-cooling water circulating pump 211, a makeup-water feed line 212, a liquid absorbent drain pump 213, a heat exchanger 214, a liquid absorbent regeneration tower 215 (which may also be called the "regeneration tower" for brevity), nozzles 216, a lower-packing section 217, a regeneration heater (reboiler) 218, an upper-packing section 219, a reflux water pump 220, a $CO_2$ separator 221, a recovered $CO_2$ discharge line 222, a reflux condenser 223 for the regeneration tower, nozzles 224, a reflux water feed line 225 for the regeneration tower, a combustion gas blower 226, and a cooler 227.

In the arrangement of FIG. 2, combustion gas is forced by combustion gas blower 226 into combustion gas cooler 208. It then comes in contact with moistening-cooling water from nozzles 209 in packing section 210 and is moistened and cooled. Next, the gas is led through combustion gas inlet 204 into $CO_2$-removal tower 201. The moistening-cooling water that has contacted the combustion gas is collected in the lower part of combustion gas cooler 208, and is recycled by moistening-cooling water circulating pump 211 to nozzles 209. The moistening-cooling water is gradually lost as it moistens and cools the combustion gas, and is replenished by a fresh supply through makeup-water feed line 212.

The combustion gas that has been forced into $CO_2$-removal tower 201 ascends through lower-packing section 202 in countercurrent contact with the liquid absorbent being sprayed at a given concentration by nozzles 207. During this, the $CO_2$ in the combustion gas is removed as it is absorbed by the alcoholic hydroxyl-containing secondary- or tertiary-amine aqueous solution, and the combustion gas freed from $CO_2$ continues to ascend into upper-packing section 203. The liquid absorbent supplied to $CO_2$-removal tower 201 thus absorbs $CO_2$ and becomes hotter owing to the heat of reaction on absorption than at liquid absorbent inlet 206. The liquid absorbent is then transferred by absorbent drain pump 213 to heat exchanger 214, where it is reheated and led to regeneration tower 215.

In regeneration tower 215, the liquid absorbent is regenerated by heating with reboiler (regeneration heater) 218, cooled by heat exchanger 214, and, via cooler 227 provided when necessary, returned to the upper part of $CO_2$-removal tower 201. The $CO_2$ that has been separated from the liquid absorbent comes in contact with reflux water from nozzles 224 in the upper part of regeneration tower 215 and is cooled by regeneration tower reflux condenser 223. Then, $CO_2$ is separated in $CO_2$ separator 221 from the reflux water that is water vapor entrained by $CO_2$ and condensed to water, and is taken out through recovered $CO_2$ discharge line 222 to a $CO_2$ removal station. Part of the reflux water is returned by reflux water pump 220 to regeneration tower 215, while the remainder is recycled through regeneration tower reflux water feed line 225 to the upper part of $CO_2$-removal tower 201.

In the practice of the invention, the $CO_2$ removal step may be preceded by a desulfurization step when the combustion gas to be handled has a large enough $SO_x$ content. In that case, the desulfurized combustion gas is further treated in the $CO_2$ removal step, whereby $SO_x$ together with $CO_2$ and $NO_2$ are almost completely removed. This is because the alcoholic hydroxyl-containing secondary- or tertiary-amine aqueous solution used in the $CO_2$ removal step reacts also with $SO_x$. When the combustion gas has too low a $SO_x$ content to justify the desulfurization step, the $SO_x$ are nearly completely removed, as well as $CO_2$ and $NO_2$, in the $CO_2$-removal tower.

Figure 3:
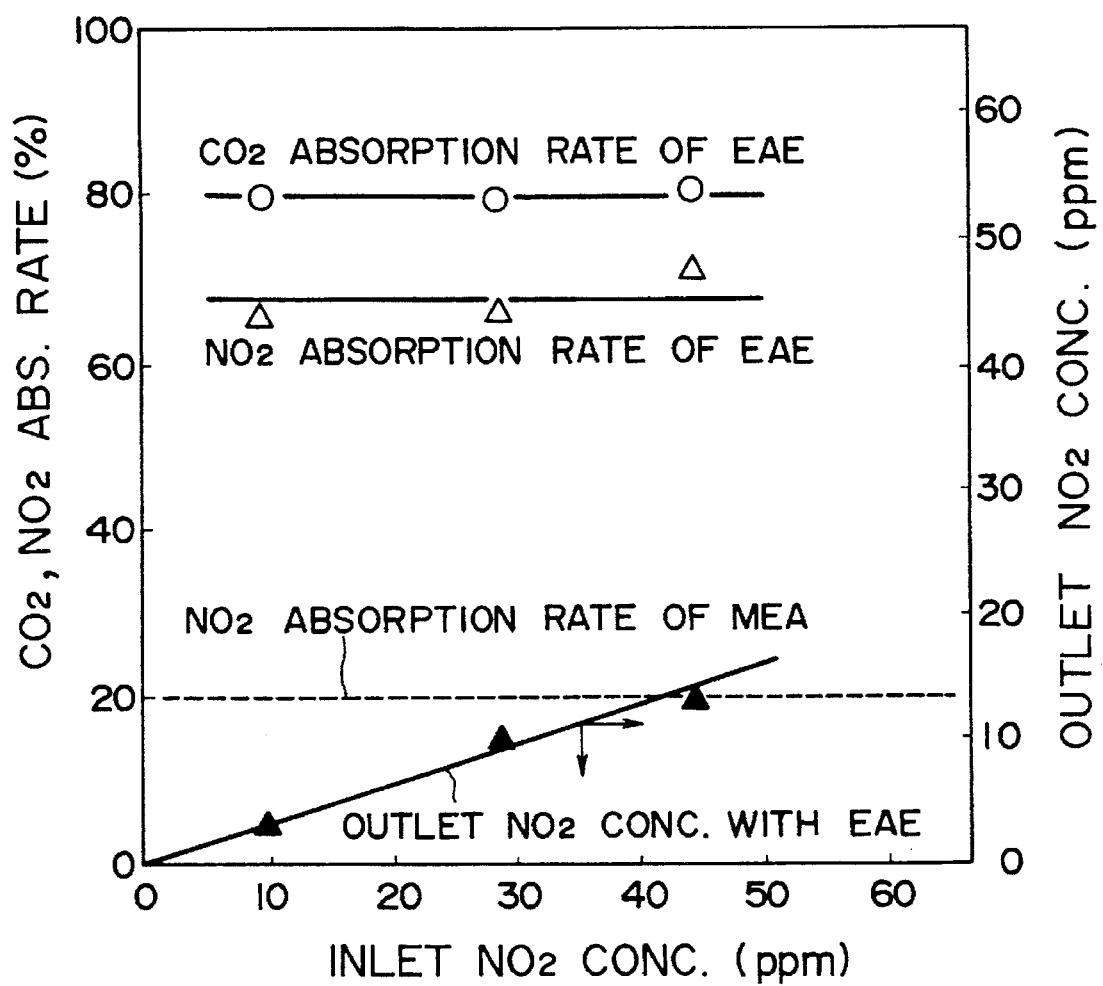
FIG. 3 is a graph showing results of wet wall tests conducted in Example 9.

Examples of the present invention will be discussed below in conjunction with Table 1 and FIG. 3.

EXAMPLES 1–8 AND COMPARATIVE EXAMPLES 1–4

First, Examples 1–8 will be explained. Into each glass reaction vessel held in a thermostatic chamber was placed 50 ml of each liquid absorbent, or alcoholic hydroxyl-containing secondary- or tertiary-amine aqueous solution, listed in Table 1. With stirring at 40° C., test gas was passed through the liquid absorbent at the atmospheric pressure at a flow rate of one liter per minute, through a filter so that bubbles can easily form. The test gas was a simulated combustion gas with a composition of 10 mol % $CO_2$, about 10 ppm $NO_2$, and 90% $N_2$ at 40° C. The test gas was continuously passed through the absorbent until the $CO_2$ concentrations in the incoming and outgoing gas streams became equal, when the $CO_2$ content in the liquid absorbent was measured using a $CO_2$ analyzer (total organic carbon meter), and the saturation absorption was found. Also, the initial outlet $NO_2$ concentration, or the $NO_2$ concentration in the gas at the outlet of the reaction vessel in the initial stage of the absorption test, was found. It may safely be said that the lower the initial outlet $NO_2$ concentration the higher the $NO_2$ absorption rate of the liquid absorbent.

By way of comparative examples, absorption tests were conducted also with aqueous solutions of primary amines listed in Table 1. The $NO_2$ saturation absorption and initial outlet $NO_2$ concentration values thus obtained too are given in Table 1.

It will be appreciated from Table 1 that the use of an alcoholic hydroxyl-containing secondary- or tertiary-amine aqueous solution in accordance with the present invention reduces the initial outlet $NO_2$ concentration, as in Examples 1 through 8, compared with the liquid absorbents of comparative examples.

All the liquid absorbents used could be regenerated, without difficulty, upon heating.

TABLE 1

| | Liquid absorbent | | $NO_2$ absorption data | | |
|---|---|---|---|---|---|
| | Amine compound | Concentration, wt % | Inlet $NO_2$ conc., ppm | Outlet $NO_2$ conc., ppm | Initial absorption rate, % |
| Comp. Ex. 1 | MEA | 30 | 10 | 10 | 0 |
| 2 | MEA | 40 | 11 | 10 | 9.1 |
| 3 | AMP | 30 | 11 | 8 | 27.3 |
| 4 | AMP +P | 30 3 | 11 | 7 | 36.4 |
| Example 1 | EAE | 30 | 10 | 5 | 50.0 |
| 2 | EAE | 40 | 10 | 6 | 40.0 |
| 3 | MAE | 30 | 10 | 5 | 54.5 |
| 4 | IPAE | 30 | 11 | 5 | 50.0 |
| Example 5 | MDEA | 30 | 11 | 4 | 63.6 |
| 6 | MDEA +P | 30 3 | 10 | 4 | 60.0 |
| 7 | DEAE | 30 | 10 | 3 | 70.0 |
| 8 | DEAE +P | 30 3 | 11 | 4 | 63.9 |

P = Piperazine; MEA = Monoethanolamine; AMP = adenylic acid.

EXAMPLE 9

As Example 9, a contact absorption test was performed with a wetted-wall absorption apparatus as a pilot equipment for the $CO_2$ removal process illustrated in FIG. 2, using a test gas adjusted to given $CO_2$ and $NO_2$ concentrations and aqueous EAE as a liquid absorbent. In order to compare, a contact absorption test was also done with aqueous MEA as a liquid absorbent. The results are shown in FIG. 3.

The testing conditions used in common with those tests were as follows. The $CO_2$ and $O_2$ concentrations in the feed gas were set to the average values of boiler combustion gases.

| [Common conditions] | |
|---|---|
| Type of $CO_2$ absorption tower: | wetted-wall absorption tower |
| Inside diameter and height of the tower: | 15 mm dia. × 7500 mm |
| $CO_2$ concentration in the gas: | 10 vol % |
| $O_2$ concentration in the gas: | 2 vol % |
| Feed gas temperature: | 60° C. |
| Feed gas quantity: | 2 m³N/h |
| Liquid absorbent concentration: | 30 wt % |
| Liquid absorbent quantity: | 4 liter/h |

As has been described in detail, the process of the present invention in its $CO_2$ removal step removes both $CO_2$ and $NO_x$ from combustion gases by oxidizing the gases in advance with ozone and thereby converting $NO_x$ in the gases into $NO_2$.

We claim:

1. A process for removing both $CO_2$ and $NO_x$ from combustion gases, comprising the steps of (a) cooling a combustion gas to 50 to 100° C.; (b) adding ozone to the combustion gas so as to oxidize NO in the combustion gas to $NO_2$; and thereafter, (c) bringing the gas into contact with an aqueous solution of an alcoholic hydroxyl-containing secondary- or tertiary-amine so as to simultaneously remove $NO_2$ and $CO_2$ from the combustion gas; wherein substantial removal of the $NO_2$ takes place in step (c) rather than steps (a) or (b).

2. The process as claimed in claim 1, wherein the combustion gas is a waste gas that results from burning of a fossil fuel.

3. The process as claimed in claim 1, wherein the ozone is air that contains ozone supplied by an ozone generator.

* * * * *